S. J. SUMMERS.
SLIDE BEARING FOR TROMBONES.
APPLICATION FILED JULY 20, 1908.
959,033.
Patented May 24, 1910.
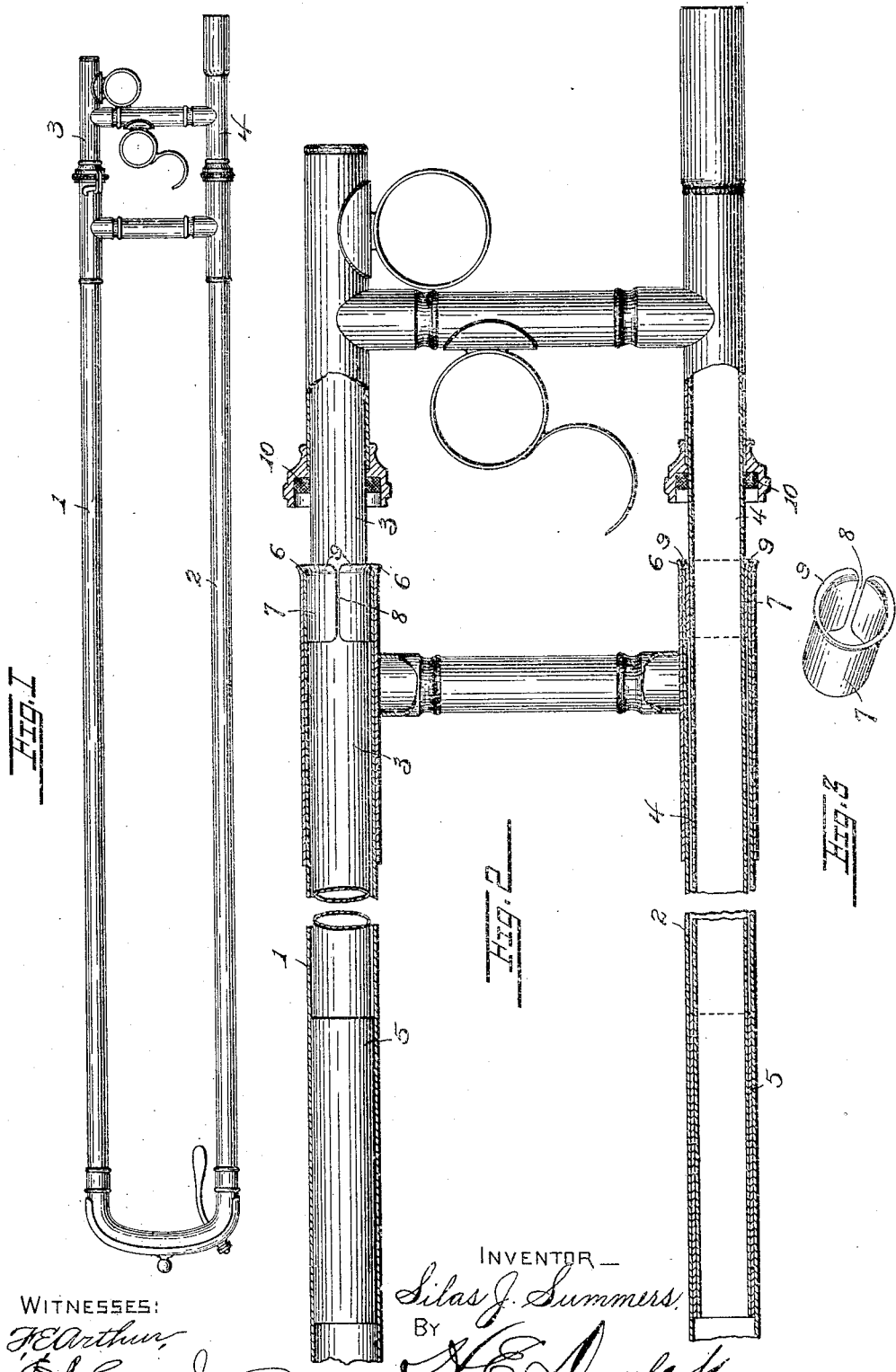
WITNESSES:
F. E. Arthur,
E. A. Lennard
INVENTOR—
Silas J. Summers,
BY
N. E. Dunlap
ATTORNEY.

UNITED STATES PATENT OFFICE.

SILAS J. SUMMERS, OF WHEELING, WEST VIRGINIA, ASSIGNOR TO HENDERSON N. WHITE, OF CLEVELAND, OHIO.

SLIDE-BEARING FOR TROMBONES.

959,033. Specification of Letters Patent. Patented May 24, 1910.

Application filed July 20, 1908. Serial No. 444,514.

*To all whom it may concern:*

Be it known that I, SILAS J. SUMMERS, a citizen of the United States of America, and resident of Wheeling, county of Ohio, and State of West Virginia, have invented certain new and useful Improvements in Slide-Bearings for Trombones, of which the following is a specification.

This invention relates to improvements in slide-bearings for trombones, and it has for its object to provide a close-fitting detachable bearing for trombone slides which at all times holds the fixed bearing portion and inner tube or slide in direct alinement with the outer tube, making the stroke direct, prevents the slides from binding and working stiff, materially reduces the friction, renders the action light, smooth and free, minimizes the wear of the slides, and prevents the throwing of oil from the end of the outer tube upon the person of the player.

With these and other objects in view, the invention finally consists in the particular construction, arrangement and combination of parts which will hereinafter be fully described, reference being had to the accompanying drawing, forming a part of this specification, in which—

Figure 1 is an elevation of a trombone slide embodying my invention; Fig. 2 is an enlarged longitudinal sectional view of the same; and—Fig. 3 is a perspective view of the slide-bearing.

Referring to said drawing, in which like reference characters designate like parts throughout the several views—1 and 2 respectively indicate the upper and lower tubes of a trombone slide, and 3 and 4 the upper and lower slides thereof, the inner end of each of said slides bearing the usual close-fitting fixed bearing portion 5, which, however, must be slightly shorter than the usual length. The ends of each of the tubes 1 and 2 are slightly flared outward into bell-mouth shape, as shown at 6, and telescoped snugly within each of said ends so as to embrace the slides is a longitudinally movable resilient or self-expanding slide-bearing 7. Said slide-bearing consists of a short spring-metal sleeve or thimble, preferably of German silver, having a longitudinal slot 8 extending from end to end thereof and having its outer end outwardly flared, as shown at 9, to substantially correspond with the flared end 6 of the tube. Said bearing or sleeve 7 expansively lays hold of the tube so that it readily and freely moves or travels over the slide therewith, coacting with the fixed bearing portion for holding the slide in direct alinement with the tube.

It will be noted that the fixed bearing portion 5 and slide-bearing 7 are the only parts which frictionally engage the tube, and that the friction of the moving parts is consequently reduced to a minimum, while tipping up and binding of the slides is prevented.

In operation, the slide-bearing 7, on account of its resilience, exerts an outwardly-directed pressure upon the tube, which effectually prevents the former from becoming disengaged from the latter while in use. When it is desired to remove said bearings from the tubes, the latter has only to be thrust forward until the inner ends of the bearings strike against the rear ends of the fixed bearing portions 5, when they are thrust outward from the tubes. To replace said bearings, the tube is drawn back until both the outer end thereof and the outer end of the bearing strike against the cushion 10, whereby the bearing is driven into position.

The flared end 9 of the slide-bearing preferably lies flush with the flared end 6 of the tube and effectually prevents oil or other lubricant from being thrown outward upon the person or clothing of the player.

Having thus described my invention, what I claim as new, and desire to secure by Letters Patent, is—

1. The combination with the outer and inner tubes of a trombone slide, of a bearing therefor, comprising a self-expanding sleeve held by the outer tube and embracing and slidable upon the inner tube.

2. The combination with the outer and inner tubes of a trombone slide, of a bearing therefor, comprising a self-expanding sleeve telescoped within the end of the outer tube and slidable with said tube over the inner tube.

3. The combination with the outer and inner tubes of a trombone slide, of a bearing therefor, comprising a spring-metal sleeve telescoped within the end of, and in binding engagement with, the outer tube, and freely slidable upon the inner tube.

4. The combination with the outer and inner tubes of a trombone slide, of a bearing therefor, comprising a spring-metal sleeve, slotted from end to end, telescoped within the end of, and in binding engagement with, the outer tube and freely slidable upon the inner tube.

5. The combination with the outer and inner tubes of a trombone slide, of a bearing therefor, comprising a spring-metal sleeve telescoped within the end of, and in binding engagement with, the outer tube and freely slidable upon the inner tube, said sleeve having its outer end outwardly flared.

6. The combination with the outer and inner tubes of a trombone slide, of a bearing therefor comprising a short spring-metal sleeve slotted from end to end and having its outer end formed into bell-mouth shape, said sleeve being in embracing engagement with and freely movable upon the inner tube and adapted for lying within and in binding engagement with the end of the outer tube.

7. In a trombone slide, an outer tube having a flared end, an inner tube carrying a fixed bearing portion, and a sleeve slidably mounted upon said inner tube and in binding engagement with said outer tube, said sleeve coacting with said fixed bearing portion for maintaining said tubes in alinement.

8. In a trombone slide, an outer tube having a flared end, an inner tube carrying a fixed bearing portion, and a sleeve telescoped within said flared end of the outer tube and in binding engagement therewith, said sleeve being slidable upon said inner tube and coacting with said fixed bearing portion for maintaining said tubes in alinement.

9. In a trombone slide, an outer tube having a flared end, an inner tube carrying a fixed bearing portion, and a sleeve having a flared outer end telescoped within said flared end of the outer tube and in binding engagement therewith, said sleeve being slidable upon said inner tube and coacting with said fixed bearing portion for maintaining said tubes in alinement.

10. In a trombone slide, an outer tube having a flared end, an inner tube carrying a fixed bearing portion, and a short spring-metal sleeve slotted from end to end and having its outer end outwardly flared, said sleeve being slidably mounted upon said inner tube and in expansive binding engagement with said outer tube.

11. In a trombone slide, an outer tube having a flared end, an inner tube carrying a fixed bearing portion, and a self-expanding sleeve slidable upon said inner tube and in telescopic binding engagement with the flared end of said outer tube.

12. In a trombone slide, an outer tube having a flared end, an inner tube carrying a fixed bearing portion, and a self-expanding sleeve in telescopic binding engagement with said flared end of the outer tube and slidably mounted upon said inner tube, said sleeve having its outer end outwardly flared.

13. A slide trombone having an inner member with bearing portions about its ends and an outer member with detachable bearings at its ends, and said bearings constructed to provide an air space between said members apart from said bearings, and said detachable bearings constructed to give vent to the air between the said members.

In testimony whereof I affix my signature in presence of two subscribing witnesses.

SILAS J. SUMMERS.

Witnesses:
CHAS. D. McCARTY,
H. E. DUNLOP.